Oct. 12, 1954   W. J. TAMMINGA   2,691,536
GASKET AND RETAINER FOR PIPE COUPLINGS
Filed July 13, 1950
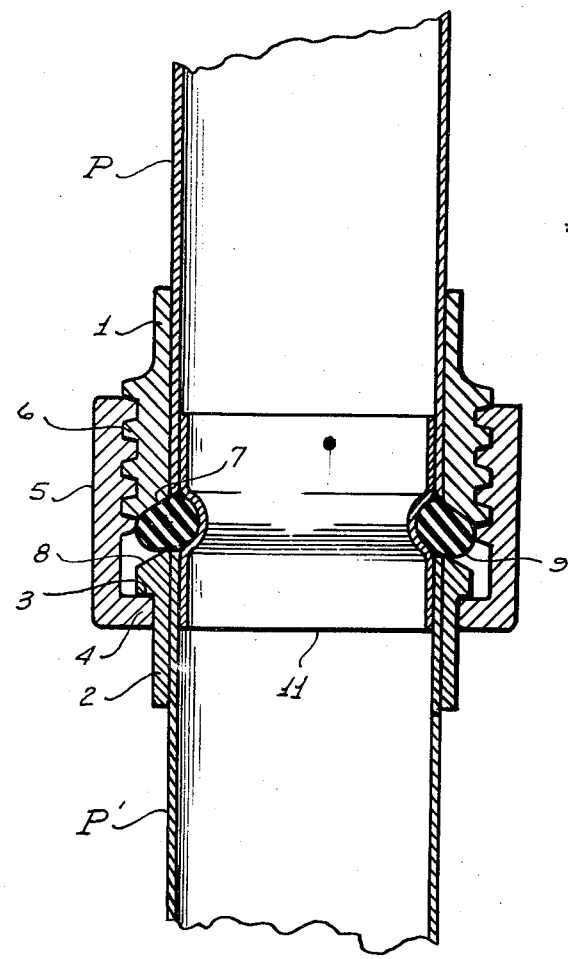
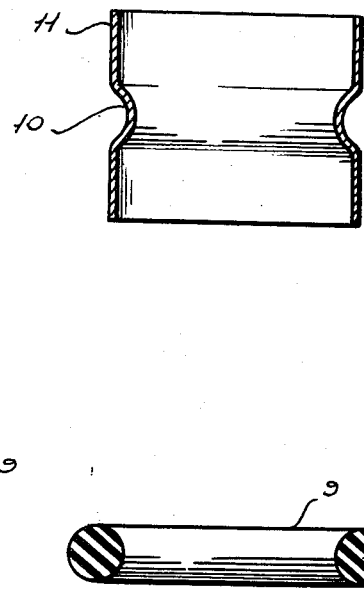
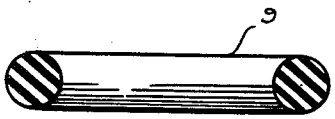
INVENTOR
WILLIAM J. TAMMINGA
BY
*Cornelius Zabriskie*
ATTORNEY

Patented Oct. 12, 1954

2,691,536

UNITED STATES PATENT OFFICE 2,691,536

GASKET AND RETAINER FOR PIPE COUPLINGS

William J. Tamminga, Goshen, N. Y., assignor to Wiz-Products, Inc., a corporation of New York Application July 13, 1950, Serial No. 173,642

1 Claim. (Cl. 285—120)

This invention is a gasket and retainer for pipe couplings of the character commonly used in dairies where milk is processed and bottled. Considerable piping is used in these plants and the various lengths of pipe are generally coupled to one another by screw fittings embodying a threaded ferrule soldered or brazed to one end of one pipe and a shouldered ferrule soldered or brazed to the contiguous end of the adjacent alined pipe section. A threaded nut provided with a flange engages the shoulder of the shouldered ferrule and is adapted to screw onto the threads of the threaded ferrule to draw the contiguous ends of said ferrules into liquidtight engagement with one another. These contiguous ends of the ferrules are commonly made complementary frustoconical and they may engage directly with one another, although generally gaskets are interposed between them.

In dairy plants it is essential that the piping be maintained in sterile condition and to do this all piping conduits are frequently taken apart and cleaned and sterilized. During these operations, the conical ends of the ferrules become damaged by striking against extraneous objects and they become pitted and worn so that liquid- and air-tight joints are extremely difficult to maintain. Furthermore it has also been found in practice that the lactic acid in the milk attacks the solder by which the ferrules are soldered to the pipe ends, causing pitting of this solder and after a time the resulting chemical action creeps into the joints, providing spaces for bacteria and other impurities.

The object of the present invention is to provide simple, convenient and economical means whereby the foregoing disadvantages may be overcome.

I have been able to accomplish this end by utilizing between the frustoconical ends of the ferrules, O-ring gaskets of rubber or some other relatively yieldable and resilient material. The difficulty with using such ring gaskets, which in order to be satisfactory must be of circular cross section, is that when the pipe ends are drawn tightly together by the coupling nut, the gaskets are apt to be squeezed into the interior of the pipe thus causing leaking joints, the spilling of milk, the entrance of air into the system and consequent requirement for shut down and drainage of the system to make the necessary repair.

I have found that it is possible to entirely overcome these objections by mounting a circular O-ring in an external annular groove positioned intermediate to the ends of a tubular cylindrical sleeve, the opposite ends of which project into the pipe ends, with the O-ring between the conical ends of the ferrule. With this arrangement, the coupling nut may be set up as tightly as desired to secure air and liquidtight joints, without danger of squeezing out the O-ring or damaging the same.

An important practical advantage of this invention resides in the fact that when a gasket ring is thus clamped between the pipe ends, it may be made to completely cover and seal the soldered joints between the pipe ends and the ferrules against contact with the milk and thus safeguard the solder of these joints against the formation therein of the cavities or pitting to which I have referred.

Features of the invention, other than those adverted to, will be apparent from the hereinafter detailed description and appended claim, when read in conjunction with the accompanying drawing.

The accompanying drawing illustrates one practical embodiment of the invention, but the construction therein shown is to be understood as illustrative, only, and not as defining the limits of the invention.

Figure 1 is a central longitudinal section through a piping connection embodying the present invention.

Figure 2 is a central longitudinal section through a retaining sleeve.

Figure 3 is a like section through the O-ring gasket.

In the drawings, P and P' designate two adjacent pipe ends. On the pipe section P is soldered the conventional threaded ferrule 1 and on the pipe section P' is soldered the conventional shouldered ferrule 2. The shoulder of this latter ferrule is indicated at 3 and it is adapted to cooperate with the inturned flange 4 of the nut 5 when the said nut is screwed on to the threads 6 of the ferrule 1. The adjacent ends of the two ferrules are complementarily frustoconical and constitute the sealing surfaces of these ferrules. The sealing surface of the ferrule 1 is indicated at 7 and that of the ferrule 2 is designated 8.

The reference character 9 designates an O-ring gasket of circular cross section, preferably made of rubber, and adapted to be seated in an annular groove 10 formed intermediate the ends of a tubular sleeve 11 shown best in Figure 2. This sleeve has an external diameter sufficiently less than the internal diameter of the pipe sections to permit of a sliding fit therewith.

In assembling the structure as shown in the drawings, the O-ring 9 is first placed in the circular groove 10 of the sleeve 11. The two pipe sections are then brought together with one end portion of the sleeve extending into the section P and the other end portion extending into the section P'. If the nut 5 is then screwed upon the ferrule 1, the contiguous sealing surfaces 7 and 8 of the two ferrules will be drawn together to cause the gasket 9 to be gripped between them. The nut should be screwed sufficiently tight to deform the O-ring 9, as shown in Figure 1, and thus produce tight intimate contact between the ring and the adjacent ferrule ends. The ring will also cover the joints between said ferrules and the pipe sections, so as to absolutely exclude contact of the milk with the solder of these joints for the purposes stated.

It will appear from the drawings that the sleeve will positively preclude bulging of the ring gasket into the confines of the pipe as it is retained against such bulging by the base of the groove 10. Of considerable importance also is the fact that the present invention may be used with the conventional standard couplings, which require no change for use with the present invention. The invention is relatively simple and may be manufactured and sold at small cost, while it solves a problem which has long vexed the milk processing industry. The ring may, if desired, be used over and over again, but inasmuch as its cost is nominal, it may be adapted for a single use if desired.

In my experimentation and tests with respect to this invention, I have used rings of different cross section. These tests have shown very definitely that in order to obtain satisfactory results, it is necessary to use an O-ring of circular cross section.

The foregoing detailed description sets forth the invention in its preferred practical form, but the invention is to be understood as illustrative, only, and not as defining the limits of the invention.

Having thus fully described the invention, what I claim as new and desire to secure by Letters Patent is:

A pipe coupling comprising: two axially alined tubes with their ends in spaced apart relation, ferrules mounted on the contiguous ends of said tubes and having opposed gasket contacting surfaces at the ends of the tubes, a tubular section fitted within and extending into the contiguous ends of both tubes for substantially the same distance and provided midway of its length and in juxtaposition with the space between the contiguous ends of the ferrules with an external circumferential channel in which is seated circumferentially disposed O-ring of circular cross section with between one-fourth and one-third of the cross sectional circumference of the O-ring conforming at all times to the cross section of the channel, the greater portion of the cross section of the O-ring projecting radially beyond the confines of the channel into the space between the contiguous ends of the tubes and ferrules, and means for drawing the ferrules together to compress the O-ring into tight engagement with both the ends of the ferrules and the ends of the tubes to form a liquidtight seal between the ferrules and tube ends and simultaneously seal the joint between each ferrule and its corresponding tube.

References Cited in the file of this patent

UNITED STATES PATENTS

| Number | Name | Date |
|---|---|---|
| 278,800 | Kline | June 5, 1883 |
| 645,144 | French | Oct. 19, 1928 |
| 2,070,291 | McHugh | Feb. 9, 1937 |
| 2,148,746 | Hampe | Feb. 28, 1939 |
| 2,453,391 | Whittingham | Nov. 9, 1948 |
| 2,458,817 | Wolfram | Jan. 11, 1949 |

FOREIGN PATENTS

| Number | Country | Date |
|---|---|---|
| 325,308 | Italy | Mar. 8, 1935 |